United States Patent
Dharmadhikari et al.

(10) Patent No.: US 11,528,736 B2
(45) Date of Patent: Dec. 13, 2022

(54) SYSTEMS AND METHODS FOR COORDINATED ACCESS POINT SCHEDULING

(71) Applicant: CABLE TELEVISION LABORATORIES, INC, Louisville, CO (US)

(72) Inventors: Omkar Shripad Dharmadhikari, Broomfield, CO (US); Ajinkya Chouthai, Milpitas, CA (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/133,612

(22) Filed: Sep. 17, 2018

(65) Prior Publication Data
US 2019/0090268 A1    Mar. 21, 2019

Related U.S. Application Data

(60) Provisional application No. 62/558,923, filed on Sep. 15, 2017.

(51) Int. Cl.
*H04W 72/12*   (2009.01)
*H04W 16/14*   (2009.01)
*H04W 28/16*   (2009.01)
*H04W 88/08*   (2009.01)
*H04W 84/12*   (2009.01)

(52) U.S. Cl.
CPC ....... *H04W 72/1289* (2013.01); *H04W 16/14* (2013.01); *H04W 28/16* (2013.01); *H04W 84/12* (2013.01); *H04W 88/08* (2013.01)

(58) Field of Classification Search
CPC ........... H04W 72/042; H04W 72/0413; H04W 52/146; H04W 72/0453; H04W 72/04; H04W 72/1289; H04W 72/1268; H04W 74/006; H04W 84/12; H04W 24/02; H04W 88/08; H04W 36/14; H04W 36/32;
(Continued)

(56) References Cited

U.S. PATENT DOCUMENTS

| 2014/0269454 A1* | 9/2014 | Papasakellariou .... H04W 52/34 370/280 |
| 2015/0319802 A1* | 11/2015 | Lindoff ................. H04W 76/28 455/422.1 |

(Continued)

*Primary Examiner* — Khaled M Kassim
*Assistant Examiner* — Najeeb Ansari
(74) *Attorney, Agent, or Firm* — Armstrong Teasdale LLP

(57) ABSTRACT

A wireless access network includes a first access point having a first coverage area, and a second access point having a second coverage area. A portion of the second coverage area overlaps with the first coverage area in an overlapping region. The network further includes a central controller in operable communication with the first and second access points, and a single station device located within the overlapping region. The single station device is configured to connect with the first and second access points. The central controller is configured to (i) control downlink data transmission from the first and second access points, and (ii) implement a scheduling protocol for the downlink data transmission, such that the single station device receives at least a first portion of the downlink data transmission from the first access point and a second portion of the downlink data transmission from the second access point.

11 Claims, 6 Drawing Sheets

(58) Field of Classification Search
CPC ... H04W 36/22; H04W 72/082; H04W 88/06; H04W 16/14; H04W 48/18
See application file for complete search history.

(56) References Cited

U.S. PATENT DOCUMENTS

| | | |
|---|---|---|
| 2016/0302106 A1* | 10/2016 | Lei .................... H04W 28/0226 |
| 2016/0330630 A1* | 11/2016 | Yoo ....................... H04L 5/0048 |
| 2017/0215171 A1* | 7/2017 | Sun ........................ H04W 72/04 |
| 2017/0366284 A1* | 12/2017 | Dinan .................... H04H 20/42 |
| 2018/0014301 A1* | 1/2018 | Chen ..................... H04L 5/0048 |
| 2018/0110042 A1* | 4/2018 | Chen ..................... H04L 5/0057 |
| 2018/0331935 A1* | 11/2018 | Ross ....................... H04L 43/16 |

* cited by examiner

SYSTEMS AND METHODS FOR COORDINATED ACCESS POINT SCHEDULING

CROSS REFERENCE TO RELATED APPLICATIONS

This application claims the benefit of and priority to U.S. Provisional Patent Application Ser. No. 62/558,923, filed Sep. 15, 2017, which is incorporated herein by reference in its entirety.

BACKGROUND

The field of the disclosure relates generally to coordination of access points (APs) used to facilitate access to communication networks, and more particularly, to systems and methods for enabling multiple APs to communicate with single users.

Conventional coordinated Multi-Point (CoMP) feature in cellular networks make use of coordinated scheduling using a centralized scheduler to determine which transmission points should transmit in each time slot, and to which user equipment (UE) by dynamically changing the transmission points for a specific UE. Conventional Wi-Fi networks make it possible for a single AP to "talk" to multiple users (e.g., downlink multi-user multiple input multiple output (DL MU-MIMO)), and technologies like IEEE 802.11ax are working to achieve multiple users being able to talk to a single AP (e.g., uplink (UL) MU-MIMO). However, at present, convention techniques do not have a protocol or Wi-Fi technology that allows multiple APs to talk to a single user.

SUMMARY

In an embodiment, a wireless access network includes a first access point having a first coverage area, and a second access point having a second coverage area. At least a portion of the second coverage area overlaps with the first coverage area in an overlapping region. The network further includes a central controller in operable communication with each of the first and second access points, and a single station device located within the overlapping region. The single station device is configured to connect with each of the first and second access points. The central controller is configured to control downlink data transmission from each of the first and second access points. The central controller is further configured to implement a scheduling protocol for the downlink data transmission, such that the single station device receives at least a first portion of the downlink data transmission from the first access point and a second portion of the downlink data transmission from the second access point.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
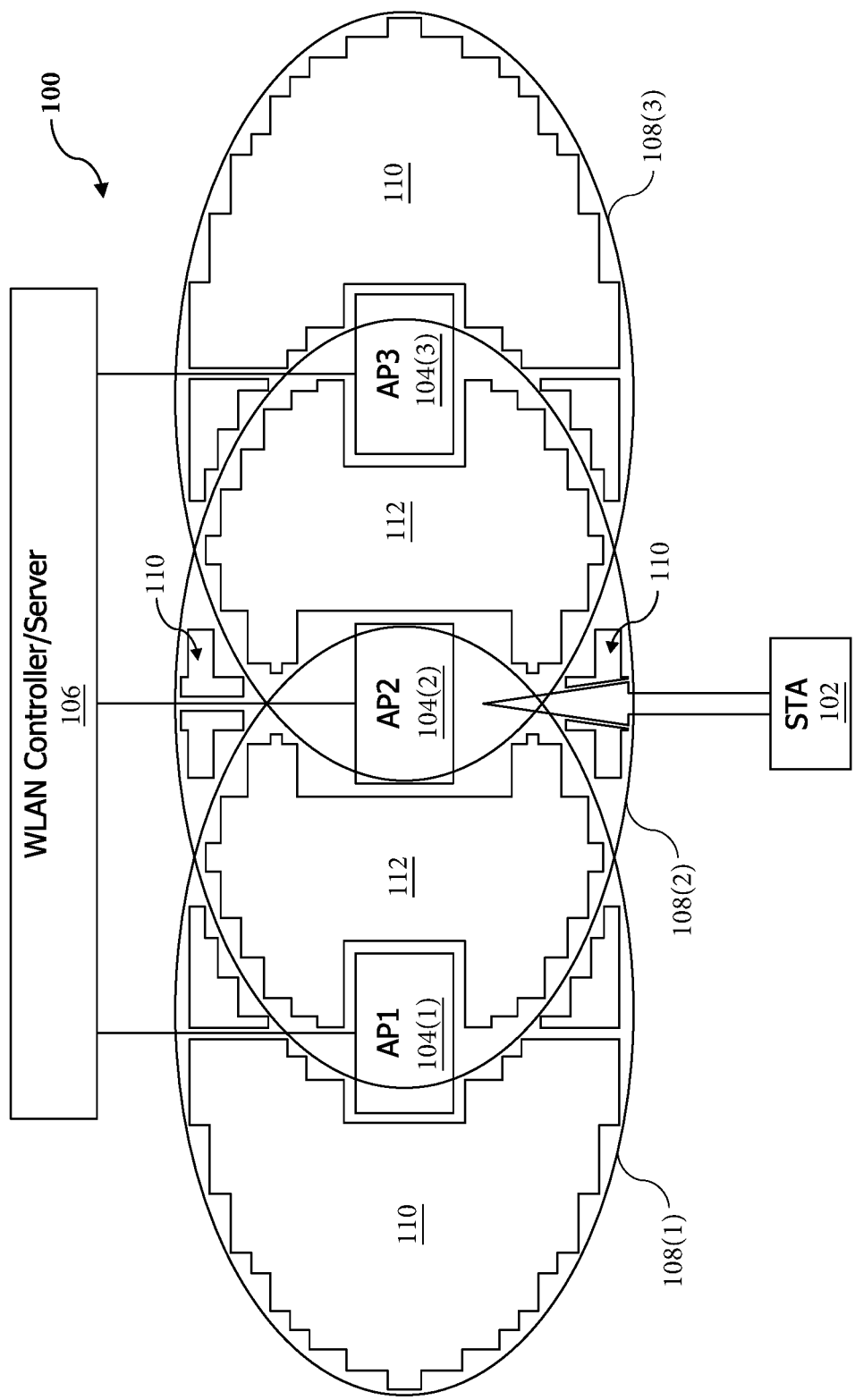
FIG. 1 is a schematic illustration of a system employing an exemplary scheduling protocol for a single station, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As described herein, "user equipment," or UE, refers to an electronic device or system utilizing a wireless technology protocol, such as LTE or WiMAX (e.g., IEEE 802.16 protocols). Furthermore, "Wi-Fi device" refers to an electronic device, such as a station (or STA), that has the capability to access and implement one or more existing IEEE 802.11 protocols. A UE or Wi-Fi device may be fixed, mobile, or portable, and may include a transceiver or transmitter-and-receiver combination. A UE or Wi-Fi device may be separate devices, or may be represented as a single device that includes media access control (MAC) and physical layer (PHY) interface, both of which may be 802.11-conformant and/or 802.16-conformant to a wireless medium (WM).

In an exemplary embodiment, an innovative scheduling protocol is provided for coordinated multi-AP scheduling. In one aspect, the new scheduling protocol enhances a user experience by increasing the airtime available to a STA when the STA is capable of being serviced by multiple APs that the STA is able to "hear." The protocol may, for example, provide a central server that connects or communicates with all APs within a respective service area, and for which the central server is enabled to make coordinated scheduling decisions to serve the STAs within coverage of the service area to which the APs are connected. In some embodiments, the central server may be a wireless LAN controller (WLC).

The present embodiments therefore improve over conventional Wi-Fi technologies, which are configured to, when encountering network congestion, move individual STAs to less-congested APs, or else utilize uplink (UL) and DL MU-MIMO technologies in the case where multiple STAs may be served by a single AP. In either case, however, each STA is served by only a single AP. In contrast, the innovative techniques described herein provide systems, methods, and protocols that advantageously allow multiple APs to serve a single STA. The protocol described herein implements a scheduling scheme that enables the single STA to be served at different respective time slots among the multiple APs, thereby increasing the available and utilized airtime of each STA among the several APs.

As described above, the scheduling protocol described herein shares some conceptual features with CoMP cellular networks, namely, with respect to the broader idea of coordinated scheduling from a central scheduler. In CoMP, for example, the centralized scheduler is able to determine which transmission points may transmit in a given time slot, and to which UE, through dynamic change of the transmission points for a specific UE. Cellular networks, however, are different from Wi-Fi networks, and at present, there is no existing protocol for Wi-Fi networks that enables multiple APs to "talk" to a single user. Conventional Wi-Fi networks have so far only developed sufficiently to render it possible for a single APs to talk with multiple users (e.g., DL MU-MIMO, UL MU-MIMO, 802.11ax), but not the other way around, namely, multiple APs talking with single users.

In an embodiment, a coordinated multi-AP scheduling protocol is provided, and utilizes a central/centralized controller or server that is configured to control the APs within the network coverage area. In an exemplary embodiment, the protocol is configured to implement processing steps (e.g., by a processor of the central server/controller) to enable two or more APs to transmit data to a single user.

In at least one embodiment, the central server is configured to execute a process that may: (1) log in a database of the central server information regarding each of the STAs, including without limitation a MAC address of the STA, an IP address of the STA, a list of APs to which the STA is directly or indirectly connected, a received signal strength indication (RSSI) with respect to different APs, a modulation and coding scheme (MCS) rate with respect to different APs, and the Wi-Fi channel; (2) create message queues for every STA in every AP of the coverage area (e.g., for a single STA connected to three APs, the controller may create three message queues for that particular STA); (3) queue data intended for a STA based on algorithms provided in the message queues; and (4) manage multiple APs to transmit the queued data to the single STAs based on the message queues (e.g., which may further implement CSMA/CA-based contention mechanisms defined in the IEEE 802.11 standard to stream downlink data).

According to these exemplary protocol techniques, from the perspective of the single STA, only one AP is scene to be transmitting the STA data, since the STA will see only one MAC address, which is the homogenous extended service set (ESS), or HESSID. That is, the HESSID is a MAC address which is the same on all APs belonging to the network. In contrast, from the network perspective, the network will see at least two (or more) APs transmitting data to the same STA, but in different time slots. These innovative concepts are described further below with respect to the following figures.

FIG. 1 is a schematic illustration of a system 100 employing an exemplary scheduling protocol for a single station 102. In an exemplary embodiment, system 100 is a wireless access network including a plurality of APs 104 (e.g., AP1, AP2 and AP3, or 104(1), 104(2), and 104(3), respectively) in operable communication with a central server 106. Central controller 106 may, for example, include a single WLAN controller (WLC) configured to manage all APs 104 connected thereto, and further configured to perform synchronized and coordinated scheduling among connected APs 104.

Further to the embodiment illustrated in FIG. 1, each AP 104 has a corresponding respective coverage area 108. In this example, the several coverage areas 108 are shown to have various areas of no overlap 110, areas of partial overlap 112 (i.e., overlap with one other coverage area 108), and at least one area of significant overlap 114 (i.e., coverage areas 108 of all three APs 104(1)-(3) overlap). A single STA with three APs are and illustrated in this example for simplicity of explanation, but not in a limiting sense. As described further below, the operating principles of the present embodiments are applicable to significantly larger numbers of STAs and APs.

In the example illustrated in FIG. 1, single STA 102 is shown to be located (i.e., the point of the arrow) within area of significant overlap 114, which falls within the respective coverage areas 108 of all three APs. At least initially, STA 102 is connected to the respective AP in nearest proximity, namely, AP 104(2) (AP2), since STA 102 is expected to receive a stronger signal from AP2 than it would from AP1 or AP3, which are farther away in proximity.

However, according to the present systems and methods, in further operation of system 100, upon determination by central server 106 that STA 102 is able to hear all three APs connected to the controller of central server 106, the WLC may then be configured to schedule all three of the APs 104 to serve STA 102, but in different time slots. That is, because STA 102 is able to also hear AP1 and AP3, the WLC is able to implement the protocols described herein to schedule STA 102 to be served by all the three APs 104 in the different time slots (described further below with respect to FIG. 5). This scheduled service among the distributed APs thus serves to increase the overall STA airtime, while also improving the efficiency of the use of network resources available to system 100.

Figure 2:
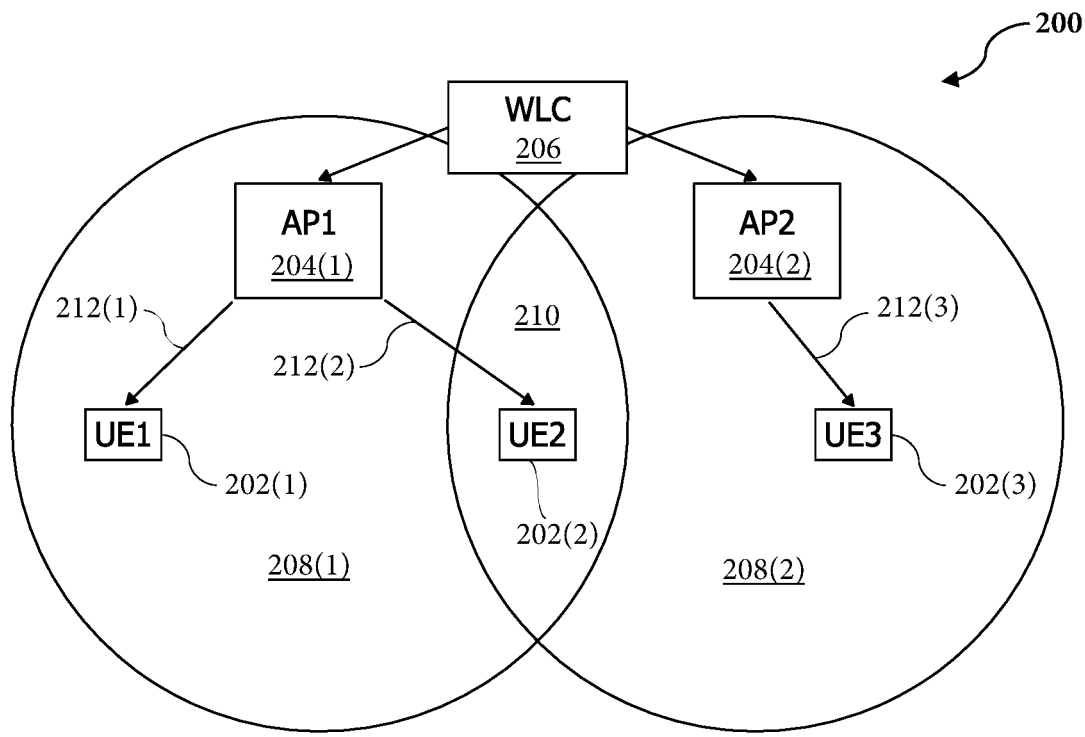
FIG. 2 is a schematic illustration depicting a wireless network configured to implement a conventional AP scheduling protocol.

FIG. 2 is a schematic illustration depicting a wireless network 200 configured to implement a conventional AP scheduling protocol. Network 200 is similar to system 100, FIG. 1, but is illustrated, for ease of explanation, with respect to three UEs 202, two APs 204, and a single WLC 206. Each AP 204 has a respective coverage area 208, and the respective coverage areas overlap within overlapping region 210. In this example, UE 202(1) (UE1) is shown to be located within coverage area 208(1) of AP1, UE 202(3) (UE3) is shown to be located within coverage area 208(2) of AP2, and UE 202(2) (UE2) is shown to be located within overlapping region 210. Under the conventional protocol, each UE 202 (i.e., a client) has a single connection 212 to a respective AP 204.

In operation of network 200, UE2 is located within the respective coverage areas 208 of both AP1 and AP2 (which are presumed to be different channels), but under the conventional protocol, UE2 only includes a single connection 212(2) to an AP (AP1 in this example). In the case where UE1 and UE2 are both streaming a large quantity of downstream data from AP1, but UE3 (i.e., connected to AP2 over connection 212(3)) is not streaming large amounts of data, operation of network 200 will be highly inefficient, and particularly with respect to UE2, which is subject to congestion at AP1, and unable to utilize the available resources at AP2 within its range. This inefficiency of network 200 is described further below with respect to FIG. 3.

Figure 3:
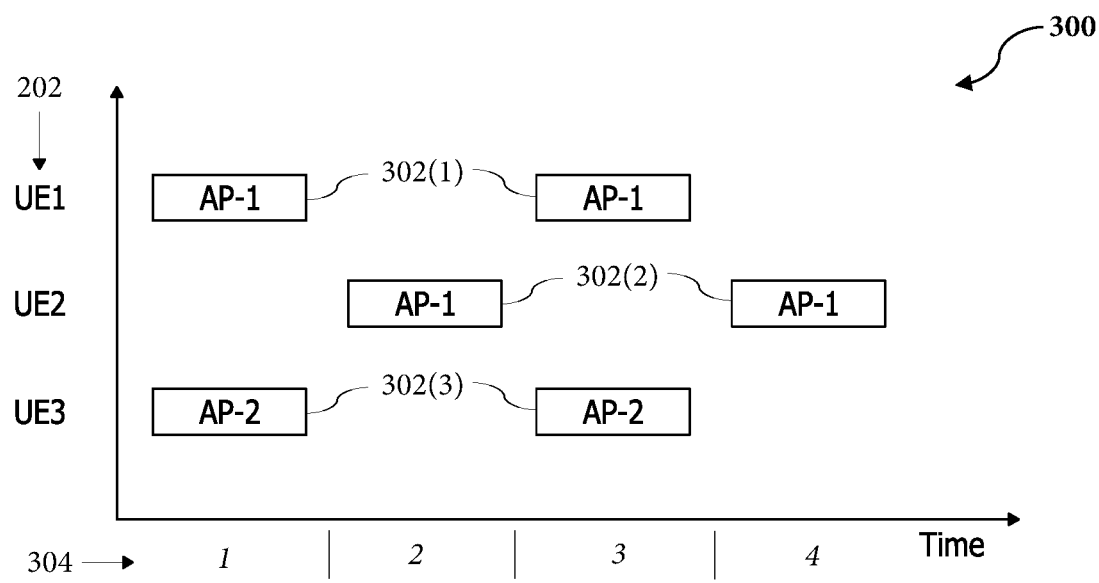
FIG. 3 depicts a data timing diagram for the wireless network depicted in FIG. 2.

FIG. 3 depicts a data timing diagram 300 for wireless network 200, FIG. 2. Timing diagram 300 illustrates a respective distribution of data transmissions 302 over a series of time slots 304, and for each of UEs 202. As can be seen from FIG. 3, UE2 must wait four time slots 304 to receive all data transmissions 302(2), despite some availability of time slots 304 used by AP2.

Figure 4:
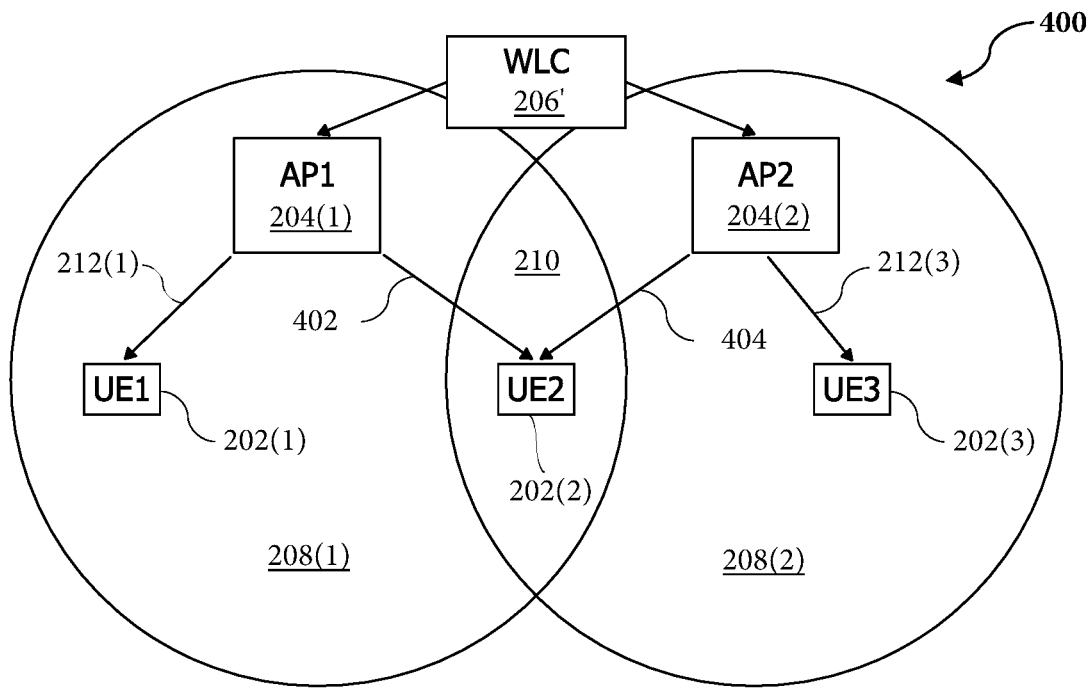
FIG. 4 is a schematic illustration depicting an exemplary wireless network configured to implement a multi-AP scheduling protocol, in accordance with an embodiment.

FIG. 4 is a schematic illustration depicting an exemplary wireless network 400 configured to implement a multi-AP scheduling protocol. In the example illustrated in FIG. 4, network 400 is substantially similar to network 200, FIG. 2, and is therefore numbered and labeled according to the same conventions. Different from network 200, however, network 400 implements the innovative multi-AP scheduling protocol described above, and achieves significant scheduling improvements over the conventional techniques.

For example, network 400 structurally includes three UEs 202, two APs 204 having respective coverage areas 208 that overlap in region 210. In this exemplary embodiment though, WLC 206' is configured to implement the multi-AP scheduling protocol of the present systems and methods. According to this protocol UE2, which is again located in region 210, now establishes both a first connection 402 with AP1, and a second connection 404 with AP2. First connection 402 may be similar to single connection 212(2), FIG. 2, except that UE2 is not restricted to only a single connection in this example.

More particularly, through implementation of the coordinated multi-AP scheduling protocol herein, UE2 is "associated" to both APs covering overlapping region 210. In exemplary operation of network 400, UE2 is capable of receiving streamed data from both AP1 and AP2. Some of the significant advantages realized through this improved scheduling protocol are further illustrated below with respect to FIG. 5.

Figure 5:
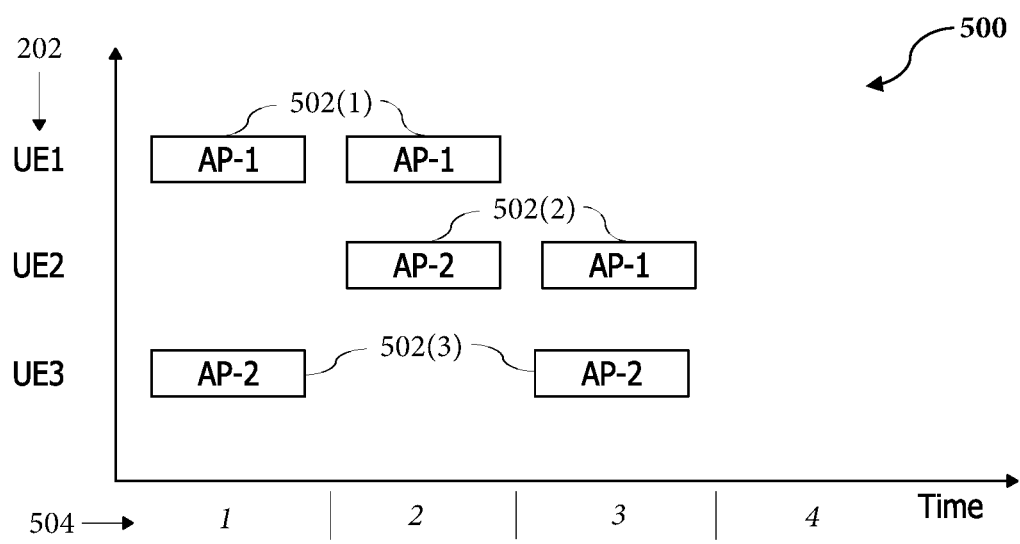
FIG. 5 depicts a data timing diagram for the wireless network depicted in FIG. 4.

FIG. 5 depicts a data timing diagram 500 for wireless network 400, FIG. 4. Timing diagram 500 is similar to timing diagram 300, FIG. 3, but illustrates, by way of comparison therewith, significant improvements achieved by the present systems and methods. Timing diagram 500, for example, similarly illustrates a respective distribution of data transmissions 502 over a series of time slots 504, and for each of UEs 202. However, different from timing diagram 300, using the non-conventional coordinated multi-AP scheduling protocol, UE2 is able to stream data transmissions from both AP1 and AP2, and thereby receive data from AP2 during time slots in which AP1 is busy. Accordingly, implementation of the coordinated multi-AP scheduling protocol results in a significant reduction to the contention overhead of network 400.

More specifically, in the example illustrated in FIG. 5, operation of data transmissions 502(3) from UE3 is essentially the same as it was using the conventional protocol (e.g., data transmissions 302(3), FIG. 3). However, as shown in timing diagram 500, UE2 sees a significant time savings, in that UE2 need only wait three time slots 504 to receive all data transmissions 502(2), as opposed to four time slots (e.g., time slots 304, FIG. 3) under the conventional protocols. Furthermore, not only does implementation of the present scheduling protocol achieve timing advantages for UE2, timing diagram 500 further demonstrates that UE1 also realizes significant time savings under this scheme. That is, according to timing diagram 500, UE1 is able to receive data transmissions 502(1) within two time slots 504, as opposed to the three time slots (e.g., time slots 304) required under the conventional scheme.

Figure 6:
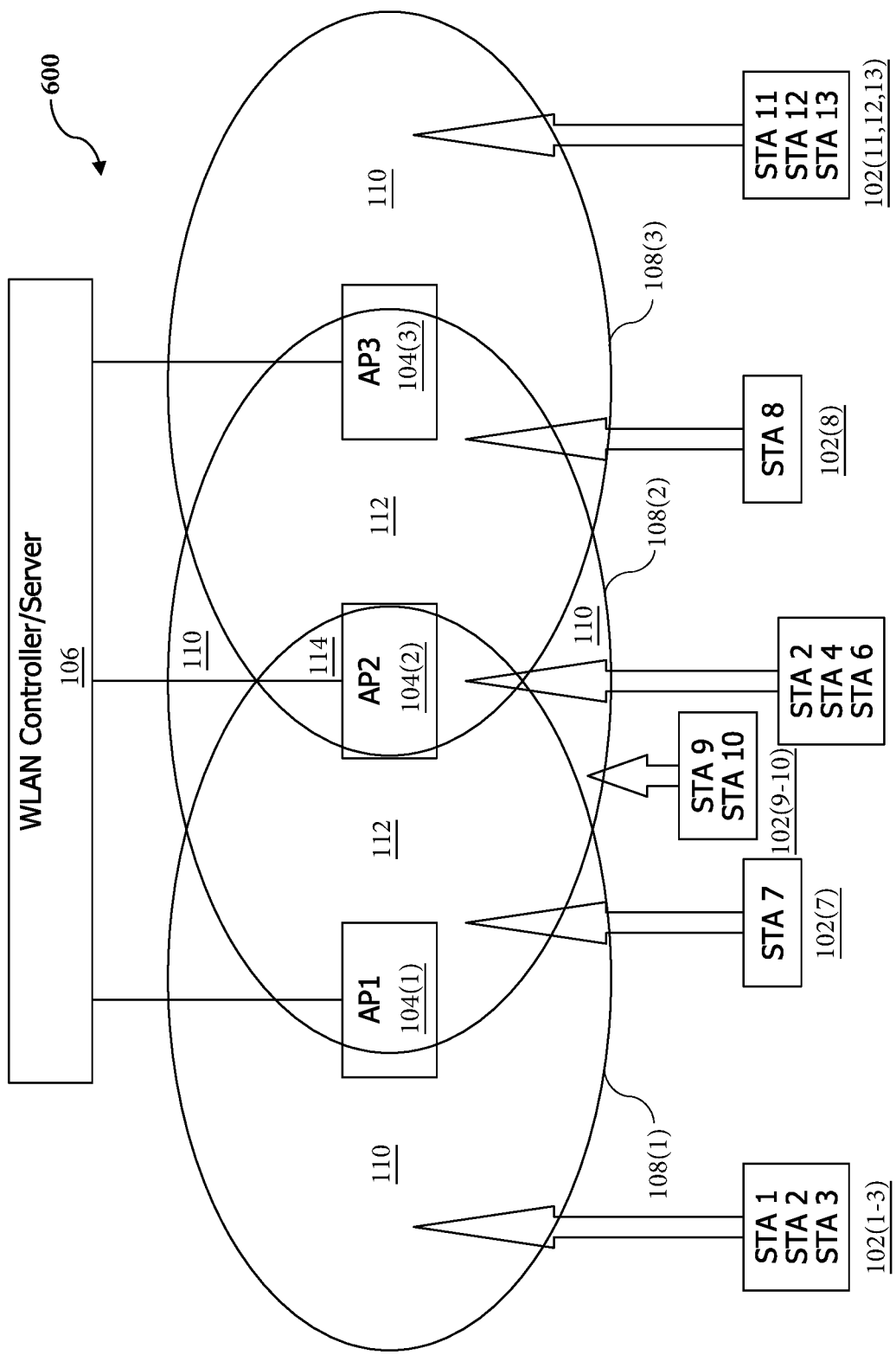
FIG. 6 is a schematic illustration of a system employing an exemplary scheduling protocol for multiple stations, in accordance with an embodiment.

FIG. 6 is a schematic illustration of a system 600 employing an exemplary scheduling protocol for multiple stations 102. In the example illustrated in FIG. 6, system 600 is substantially similar to system 100, FIG. 1, and is therefore numbered and labeled according to the same conventions. Different from system 100, however, system 600 is illustrated with respect to a plurality of STAs 102 (13 in this example, numbered 102(1)-102(13), or STA1-STA13, respectively) instead of a single STA 102 (e.g., FIG. 1). System 600 is otherwise is substantially the same as system 100, for purposes of this example, to explain the scalability advantages through implementation of the coordinated multi-AP scheduling protocol described herein.

In the example illustrated in FIG. 6, each of STAs 102 are shown to be located within one of the respective areas of overlap/no overlap 110, 112, 114. More specifically, in this example, STA1, STA3, STA5, and STA9-STA13 are shown to be located within areas 110 of no overlap, STA7 and STA8 are shown to be located within areas 112 of partial overlap, and STA2, STA4, and STA6 are shown to be located within an area 114 of significant overlap. With respect to network 600, an exemplary implementation of the coordinated multi-AP scheduling protocol is described further below with respect to FIG. 7.

Figure 7:
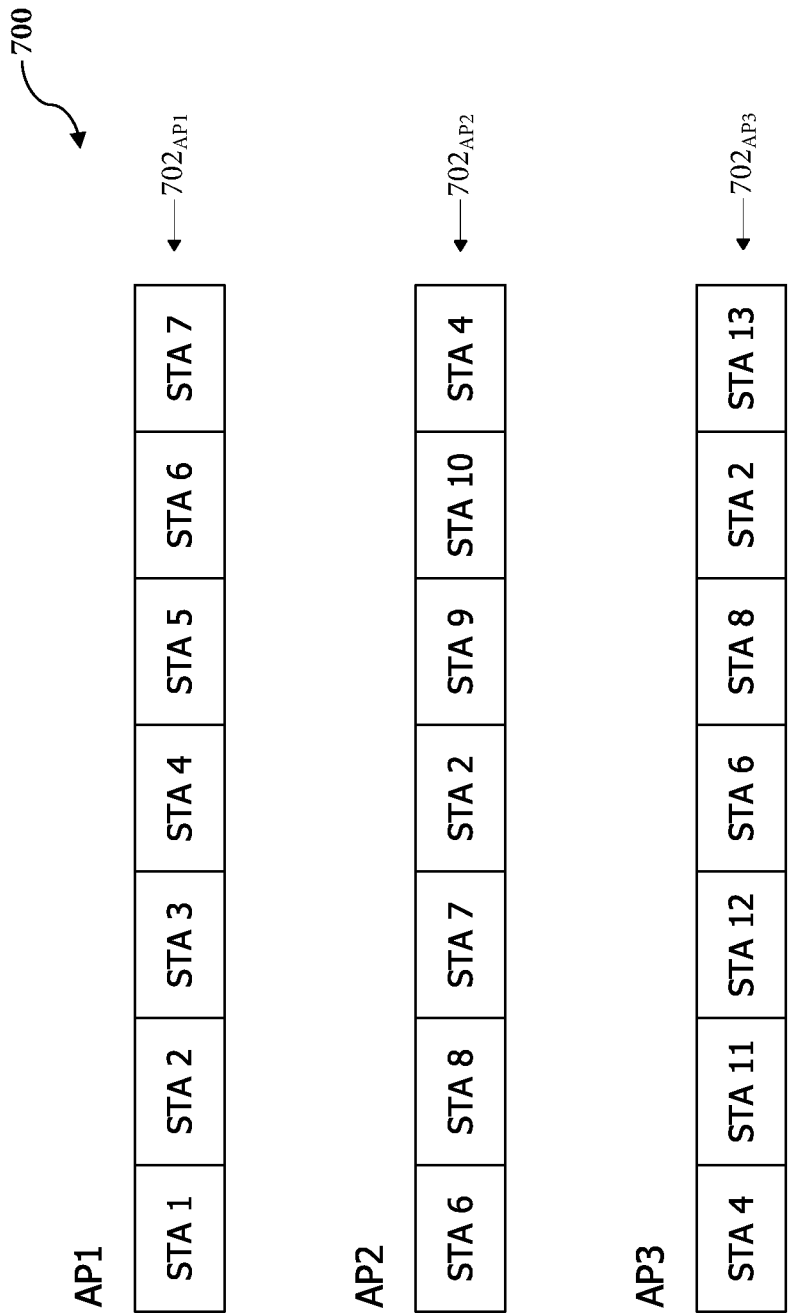
FIG. 7 depicts in exemplary scheduling architecture for the system depicted in FIG. 6.

FIG. 7 depicts in exemplary scheduling architecture 700 for system 600, FIG. 6. In the exemplary embodiment, WLC 106 is configured to schedule the plurality of STAs 102 to be served by the several APs 104 according to the respective location of the particular STA 102, and also according to the ability of the STA 102 to hear a particular AP 104 (e.g., STA being located within coverage area 108 of that particular AP 104). In this example, it is assumed for purposes of explanation, that all APs 104 are transmitting on different respective channels.

Thus, the respective STAs 102 that are within areas 110 represent STAs that are within a coverage area 108 of only one AP 104. For example, STA1, STA3 and STA5 are located in coverage area 108(1) of AP1, and therefore can hear only AP1. Similarly, STA9 and STA10 are located in coverage area 108(2) of AP2, and can hear only AP2, whereas STA11-STA 13 are located in coverage area 108(3) of AP3, and can hear only AP3. That is, all eight of these STAs 102 are served by only a single AP 104, which each respective STA 102 can hear.

In a similar manner, STA7 is located in both coverage areas 108(1) and 108(2) of AP1 and AP2, respectively, and can therefore hear both AP1 and AP2. STA8 is located in both coverage areas 108(2) and 108(3) of AP2 and AP3, respectively, and can therefore hear both AP2 and AP3. Accordingly, under the coordinated multi-AP scheduling protocol of the present embodiments, both STA7 and STA8 are capable of being serviced by two APs that the respective STA can hear. Likewise, since STA2, STA4, and STA6 are located in all three coverage areas 108 of AP1, AP2, and AP3, each of these three STAs 102 is able to hear all three APs 104, and thus all three of these STAs 102 may be served by any or all of the several APs 104.

In exemplary operation of scheduling architecture 700, WLC 106 may be configured to schedule respective transmissions 702, for each STA 102, among the respective APs, such that transmissions 702 does not overlap, while still effectively providing more (e.g., maximizing) air time to each STA 102 in different time slots among the respectively available APs 104. In some embodiments, after being served by a particular AP 104, an individual STA 102 may be served by a different AP 104 (i.e., that the individual STA 102 can hear) until the individual STA 102 again contends again to be served by the first particular AP 104.

The embodiments described above present only some exemplary schemes to effectively implement the present scheduling protocols. The scheduling techniques described herein though, may be advantageously implemented, in a complementary fashion, with respect to one or more conventional scheduling protocols, such as, DL MU-MIMO, where multiple STAs are served by a single AP simultaneously. With appropriate scheduling algorithms implemented at the WLC, each such AP will be enabled to serve multiple APs simultaneously using MU-MIMO, while each STA will be enabled to be served by multiple APs during different time slots. This complementary implementation of the present protocols with the conventional protocol will significantly increase the ability of the network/system to reduce or eliminate data traffic congestion, while also greatly enhancing the user experience with better throughput and more air time. In exemplary architecture for integrated protocol implementation is described below with respect to FIG. 8.

Figure 8:
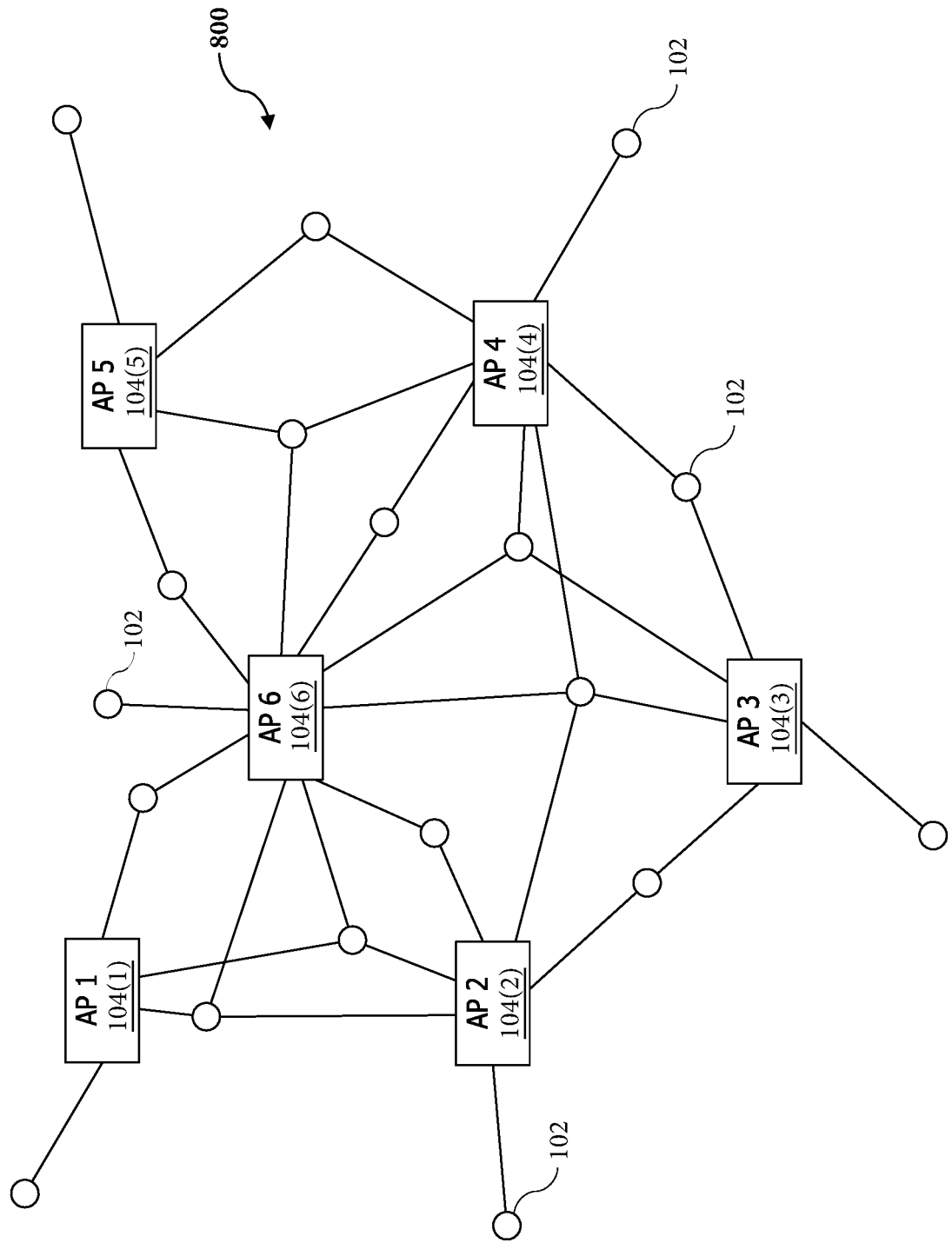
FIG. 8 is a schematic illustration of a system employing a coordinated multi-AP scheduling protocol with a downlink multi-user multiple input multiple output protocol, in accordance with an embodiment.

FIG. 8 is a schematic illustration of a system 800 employing a coordinated multi-AP scheduling protocol with a DL MU-MIMO protocol. In an exemplary embodiment, system 800 demonstrates an exemplary network distribution of clients/STAs 102 among a plurality of APs 104. Under the DL MU-MIMO protocol, each AP 104 is capable of communicating with a plurality of STAs 102. However, under the present coordinated multi-AP scheduling protocol, STAs 102 are also capable of simultaneously communicating with the plurality of APs 104, assuming, that is, that a particular STA 102 is able to hear a neighboring AP 104. In this example, some STAs 102 are shown to communicate with only a single AP 104, which may represent an actual use case in practice, or may instead merely reflect the scale limitations of the example illustrated in FIG. 8 (i.e., the network distribution of system 800 may theoretically expand well beyond the elements depicted in this drawing).

According to the embodiments described above, the coordinated multi-AP scheduling protocol is of particular use with respect to large-scale Wi-Fi deployments, including without limitation, Hotspot deployments, enterprise deployments, and "Whole Home" Wi-Fi solutions. The protocol also achieves general benefits for essentially within a respective coverage area. It has been recently demonstrated through experimental surveys, that most data downloads are performed by stationary users (i.e., as opposed to mobile users). Accordingly, the present protocol significantly increases the airtime available to stationary users who are able to hear more than one AP with synchronized DL scheduling of data from multiple APs. Nevertheless, the present inventors contemplate application of the present scheduling techniques for mobile users as well, for example, through implementation of dynamic scheduling algorithms, such as Fast Seamless Transition (FST, which is available with 802.11r), reduced airtime overhead of Probe Request and Probe Response frames, short connection setup times, and other signaling reductions available with 802.11ai.

In the examples described above, different channels for respective APs are assumed for ease of explanation. Nevertheless, the scheduling techniques described herein are fully applicable in the case of multiple serving APs operating within the same channel. That is, the protocol embodiments described herein are applicable to APs operating in the same or different channel. In an exemplary embodiment, in the case of two serving APs operating in different channels the present systems and methods may be configured such that an individual STA is informed/notified to switch channels before the individual STA can be served by new AP on a different channel. In this scenario, the WLC may be configured to also perform synchronization to more effectively coordinate the scheduling, and implement the protocol thereby.

In the exemplary embodiments described above, the Wi-Fi network in which the coordinated multi-AP scheduling protocol is implemented will include a plurality of APs connected to a central server or WLC, and the server/WLC is able to control scheduling of at least downlink data for any user served by one of the connected APs within the network. In at least one embodiment, all APs connected to the server/WLC are broadcasting the same SSID. It is presumed, for all of the embodiments described above, that at least two APs will have overlapping coverage areas of the Wi-Fi network, and at least one user (e.g., STA) is located within an overlapping coverage area and able to hear at least two APs.

According to the present systems and methods, a Wi-Fi network is able to realize significantly improved network utilization over conventional networks, by more efficiently utilizing available resources to serve users/clients. The users/clients similarly will realize a greatly enhanced user experience, by gaining significantly more airtime through the synchronized downlink scheduling enabled by the protocols of the present embodiments. Multiple service operators (MSOs), by implementing the protocol techniques herein, will similarly benefit from allowing multiple APs to serve a specific user by coordinated and synchronized scheduling, and thereby render the MSO network resources more efficient.

Exemplary embodiments of systems and methods for coordinated scheduling of multiple access points are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A central controller for a wireless access network implementing 802.11-conformant Wi-Fi protocol, the central controller in operable communication with a first access point (AP) having a first Wi-Fi coverage area and a second AP having a second Wi-Fi coverage area different from the first Wi-Fi coverage area, the central controller comprising:
a processor configured to manage the first and second APs to transmit a first downlink Wi-Fi transmission, according to a Wi-Fi scheduling protocol, to a first Wi-Fi enabled user equipment device (UE) located within an overlap region disposed within a portion of the first Wi-Fi coverage area and a portion of the second Wi-Fi coverage area, the first UE in operable communication with and configured to connect to each of the first and second APs;
a memory device for storing computer-executable instructions, which, when executed by the processor, cause the processor to:
receive (i) first station information regarding the first UE, (ii) first AP information regarding the first AP, and (iii) second AP information regarding the second AP;
log the first station information and the first and second AP information into the memory device as first logged information;
generate a first message queue for the first downlink Wi-Fi transmission according to the first logged information;
distribute (i) a first portion of the first message queue to the first AP, and (ii) a second portion of the first message queue, different from the first portion of the first message queue, to the second AP; and
manage, according to the Wi-Fi scheduling protocol, (1) the first AP to transmit the first portion of the first message queue to the first UE, and (ii) the second AP to transmit the second portion of the first message queue to the first UE.

2. The controller of claim 1, wherein the computer-executable instructions further cause the processor to control (i) the first AP to transmit the first portion of the first message queue to the first UE during a first time slot, and (ii) the second AP to transmit the second portion of the first message queue during a second time slot different from the first time slot.

3. The controller of claim 2, wherein the computer-executable instructions further cause the processor to:
receive third AP information regarding a third AP in operable communication with the central controller, and second station information regarding a second UE located within a portion of the second Wi-Fi coverage area and a third Wi-Fi coverage area of the third AP, and a second downlink Wi-Fi transmission to the second UE;
generate a second message queue for the second downlink Wi-Fi transmission according to the third AP information; and
control the second AP to transmit a portion of a second message queue to the second UE during the first time slot.

4. A method for communicating a single downlink 802.11-conformant Wi-Fi transmission to a first Wi-Fi enabled user equipment device (UE) in a wireless network, the first UE being located within an overlap region of a first access point (AP) having a first Wi-Fi coverage area and a second AP having a second Wi-Fi coverage area different from the first Wi-Fi coverage area, the first UE in operable communication with and configured to connect to each of the first and second APs, the method executed by a server device having a server database and in operable communication with of the first and second APs, the method comprising the steps of:
recording, in the server database, information relating the first UE to the first AP and information relating the first UE to the second AP;
creating a first message queue for the first UE;
queueing Wi-Fi data intended for the first UE into a first data queue based on the created first message queue; and
managing, according to a Wi-Fi scheduling protocol stored within the server database, (i) the first AP to transmit a first portion of the first data queue to the first UE, and (ii) the second AP to transmit a second portion of the first data queue to the first UE, wherein the first portion is different from the second portion.

5. The method of claim 4, wherein the recorded information comprises at least one of a MAC address of the first UE, an IP address of the first UE, a Wi-Fi channel, and a list of APs to which the first UE is directly or indirectly connected.

6. The method of claim 4, wherein the recorded information comprises at least one of a received signal strength indication (RSSI) of the first UE with respect to the first AP and an RSSI of the first UE with respect to the second AP, and a modulation and coding scheme (MCS) rate of the first UE with respect to the first and second APs.

7. The method of claim 4, wherein the recorded information comprises at least one of a MAC address of the first UE, an IP address of the first UE, and a list of APs to which the first UE is directly or indirectly connected.

8. The method of claim 4, wherein the step of managing causes (i) the first AP to transmit the first portion of the first data queue to the first UE during a first time slot, and (ii) the second AP to transmit the second portion of the first data queue to the first UE during a second time slot different from the first time slot.

9. The method of claim 4, wherein the step of recording further comprises recording information regarding a third AP in operable communication with the server device and a second UE located within an operational range of the second AP and the third AP.

10. The method of claim 9, further comprising a step of generating a second message queue for a second downlink Wi-Fi transmission transmitted to the second UE from the second AP, and a third message queue for a second downlink Wi-Fi transmission transmitted to the second UE from the third AP.

11. The method of claim 10, wherein the second and third message queues are transmitted to the second UE according to the scheduling protocol.

\* \* \* \* \*